United States Patent [19]

Chomet

[11] Patent Number: 4,623,918

[45] Date of Patent: Nov. 18, 1986

[54] PAY TELEVISION SYSTEM UTILIZING MULTI-FREQUENCY PASSIVE FILTERS

[75] Inventor: Marc Chomet, Huntington, N.Y.

[73] Assignee: Teleglobe Pay-TV System, Inc., New York, N.Y.

[21] Appl. No.: 490,434

[22] Filed: May 2, 1983

[51] Int. Cl.⁴ .................. H04K 1/02; H04N 7/167; H03H 7/00

[52] U.S. Cl. .................................. 358/118; 333/175; 333/176; 333/177; 455/30

[58] Field of Search ............... 358/114, 118, 121, 122, 358/123; 455/30; 179/1.5 M; 333/177, 176, 175, 12

[56] References Cited

U.S. PATENT DOCUMENTS

| | | | |
|---|---|---|---|
| 2,348,026 | 5/1944 | Peterson | 333/176 |
| 2,812,433 | 11/1957 | Stolk | 333/176 |
| 2,905,747 | 9/1959 | Kidd et al. | 358/121 |
| 4,074,311 | 2/1978 | Tanner et al. | 358/121 |
| 4,097,894 | 6/1978 | Tanner et al. | 358/118 |
| 4,099,203 | 7/1978 | Garodnick et al. | 358/118 |
| 4,222,067 | 9/1980 | Stern et al. | 358/114 |
| 4,409,569 | 10/1983 | Potash | 333/177 |
| 4,453,145 | 6/1984 | Schuster | 333/175 |

Primary Examiner—S. C. Buczinski
Attorney, Agent, or Firm—Erwin S. Teltscher

[57] ABSTRACT

Selected interference frequency signals are inserted into the video or RF signal at the transmitter for scrambling purposes, either singly or in pairs. At the receiving end the signals are decoded by use of filters matched to the transmitted signal. The system allows different scrambling for each pay program thereby increasing the security relative to the prior art single frequency system.

3 Claims, 6 Drawing Figures

PAY TELEVISION SYSTEM UTILIZING MULTI-FREQUENCY PASSIVE FILTERS

CROSS REFERENCE TO RELATED PUBLICATIONS AND APPLICATIONS

1. U.S. Pat. No. 4,074,311;
2. U.S. Pat. No. 4,097,894.

FIELD OF THE INVENTION

The present invention relates to pay television systems and, more particularly to cable pay television system utilizing passive filters.

BACKGROUND OF THE INVENTION

At present, pay-per-view cable television systems have two problems. Either they are very complicated, require active circuits, and are therefore expensive to implement or, on the other hand, they are inexpensive to implement but insufficiently secure. The inexpensive, relatively insecure type of system involves the generation of a signal within the video baseband of the program to be denied, insertion of the signal into the transmitted video signal and use of the filter at the subscriber end to remove the unwanted carrier. This system is disclosed in U.S. Pat. No. 4,074,311. A passive filter at the subscriber end allows the unwanted carrier to be removed, thereby causing clear reception of the desired program. This approach is economically attractive, but possession of the filter allows the subscriber to decode all future programs, since all are scrambled in the same way.

SUMMARY OF THE INVENTION

In accordance with the present invention, the repeated use of the same filter by the subscriber is avoided by the use of several frequencies either simultaneously or singly, so that the subscriber will have to acquire a matching filter for the particular program he desires to view.

Thus, a program signal is generated during each viewing unit. The viewing unit includes the whole program for which the subscriber is paying. Means are provided for generating at least three interference frequencies. One, two, or all three of the interference signals are injected into the program signal, thereby creating a coded television signal. The coded television signal is then transmitted to a plurality of subscriber locations. At each location the signal will be decoded by filtering out the interference signal or signals with a matching filter furnished to, and installed by, the subscriber.

Preferably, the filter is manufactured by use of Surface Acoustic Wave technology to provide the needed electrical characteristics within an acceptable price range. Alternatively, an embodiment utilizing discrete components is illustrated.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
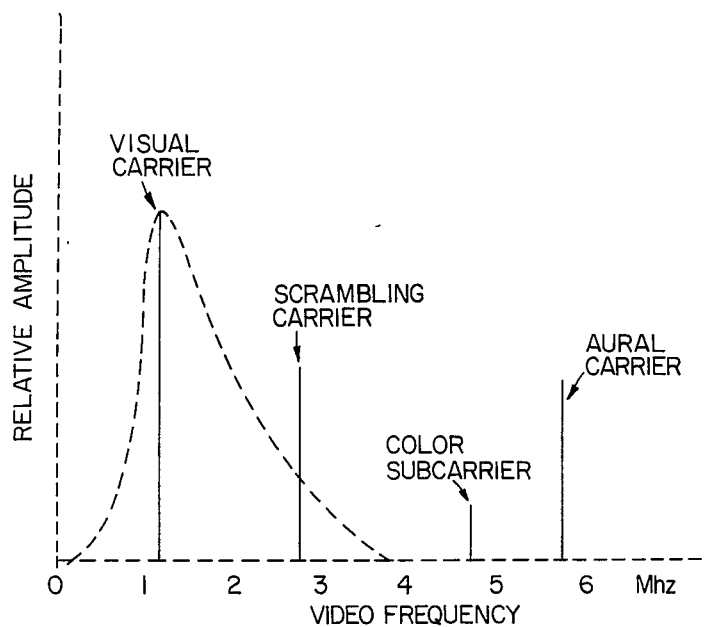
FIG. 1 illustrates a video frequency spectrum with a single scrambling carrier as in the prior art.

A prior art system utilizing a single scrambling carrier has a frequency spectrum as illustrated in FIG. 1. Such a system is disclosed in U.S. Pat. No. 4,074,311. The injection of a single carrier allows the signal to be decoded by a passive filter. While this is a very economical way of operating a subscriber television system, it is not acceptable in practice, since possession of the filter allows the user to decode all future programs. all of such programs being coded in the same way.

Figure 2:
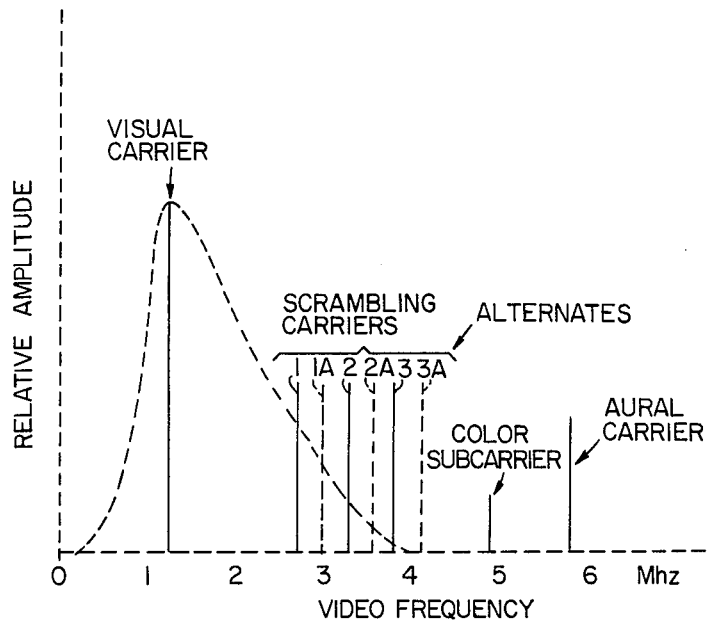
FIG. 2 illustrates a video frequency spectrum with a plurality of scrambling carriers.

The repeated use of the same filter by a subscriber is avoided by use of several frequencies either simultaneously or singly, so that a matching filter is required for each program to be decoded. The frequency spectrum of such a system is illustrated in FIG. 2. For example, use of scrambling carriers 1, 2, and 3, indicated by the solid lines in FIG. 2, will, theoretically, allow seven different encoding and decoding modes. First each of the three frequencies could be use singly. Secondly, the frequencies could be use in pairs, thereby allowing three additional encoding and decoding modes. A seventh combination could be obtained by using all three frequencies simultaneously, but with the current state of the art the filters required to filter out the three frequencies at the receiving end would cause excessive deterioration of the program signal.

Twelve combinations of frequencies, providing an operator with once a month pay-per-view opportunity, may be had by use of three frequencies at any one time and another set of three frequencies offset relative to the first. This is also illustrated in FIG. 2, where the offset frequencies are indicated by dashed lines. In FIG. 2, two frequencies of either set may be chosen to encode any one program. In addition, if sufficient frequency separation is maintained, one signal from each of the sets may be chosen to encode a program. For example, frequency 1 and frequency 2A could be injected into a program signal, as could frequencies 1A and 3. At least nine different two-frequency combinations are possible with such a system.

Figure 3:
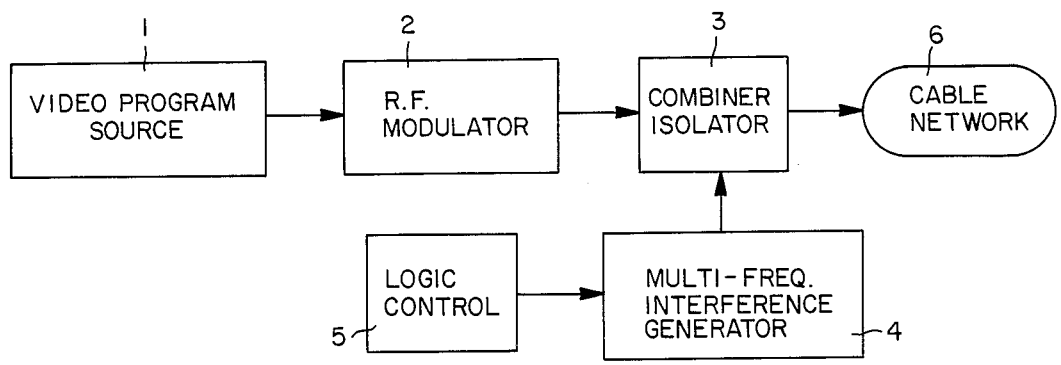
FIG. 3 is a block diagram of the encoding system according to the present invention.
Figure 4:
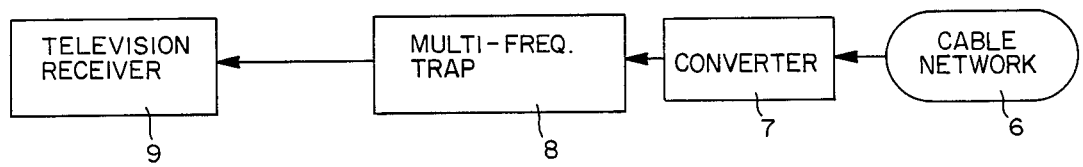
FIG. 4 is a block diagram of the decoding system of the present invention.

The transmitting end of the system of the present invention is illustrated in FIG. 3. Here, reference 1 denotes the video program source which is connected to an RF modulator 2. The output of the RF modulator is connected to a combiner/isolator unit 3 which also receives the output of the multi-frequency interference generator 4 activated by a logic control circuit 5. The output of the combiner/isolator unit is applied to the cable network 6. The interference is thus added at the RF level. It would of course be equally possible to insert the interference at the video level.

At the decoding end, the cable network 6 furnishes the encoded signal to a converter 7. The output of the converter is fed to a multi-frequency trap 8 which furnishes a decoded output signal to television receiver 9.

Figure 6:
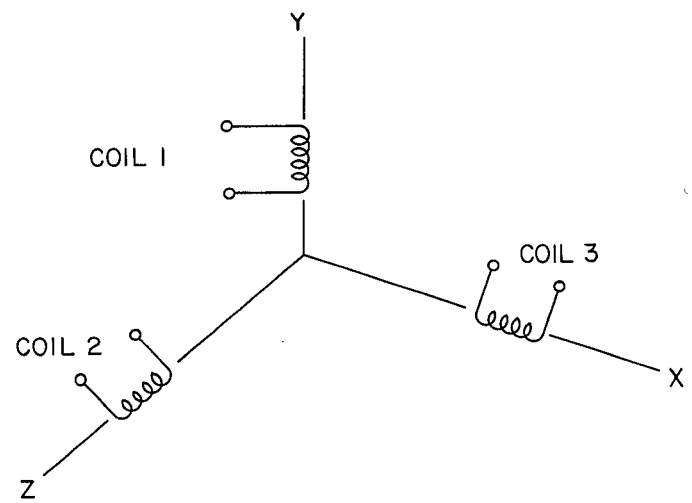
FIG. 6 illustrates the coil placement for minimum mutual coupling for a filter according to the present invention.
Figure 5:
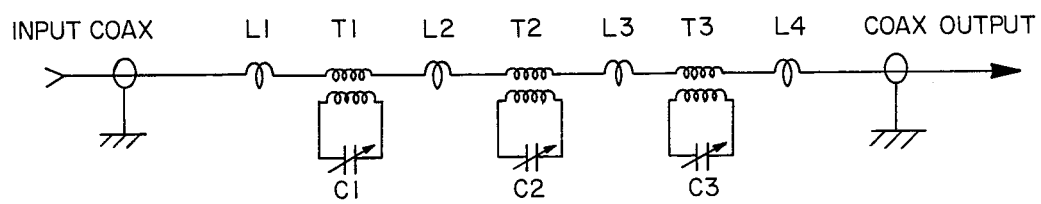
FIG. 5 is a schematic diagram of a multi-frequency trap using discrete components.

The passive filters which may be installed by the subscriber prior to the showing of the program for which he has committed himself to pay may be constructed by either Surface Acoustic Wave technology or by use of discrete components. The former allows the necessary electrical characteristics to be attained within an acceptable price range. Such filters can be produced with good repeatability and a minimum of labor and handling. For a multifrequency trap utilizing discrete components, the embodiment of FIG. 5 is preferred. It should be noted that, while the usual approach is to use series shunt filters, good results have been obtained with the parallel circuit traps illustrated in FIG. 5. In this figure, the input coaxial cable is connected through an inductor L1 to the primary of a transformer T1. The transformer T1 has a secondary winding connected to a capacitor C1. The so-formed tank circuit is tuned to the first frequency to be filtered out of the received signal. The second and third frequencies are filtered out by similar transformers T2 and T3. The primary winding of transformer T3 is connected to that of transformer T2 through an inductor L3 and to the output terminal through an inductor L4. The inductors isolate the individual tuned circuits from one another and, further, constitute a transmission line for the main RF signal. If, in addition, transformers T1, T2, and T3 are placed orthogonally to one another as illustrated in FIG. 6, notches as deep as 20 to 25 db may be achieved with this type of circuit.

While the invention has been described with reference to specific embodiments, many variations will be readily apparent to one skilled in the art and are intended to be encompassed in the following claims.

I claim:

1. Pay-per-view television system for viewing units, comprising in combination,
    means for generating a program signal throughout each viewing unit,
    means for generating at least a first, second, and third interference signal, having respectively a first, second, and third frequency,
    means connected to said interference signal generating means and to said program signal generating means for injecting at least a selected two of said interference signals simultaneously into said program signal, thereby creating a coded signal,
    means for transmitting said coded signal to a plurality of subscriber locations, and
    filter means, including at least a two frequency trap constructed with discrete components,
    said two frequency trap having an input terminal connected to receive said coded television signal, an output terminal adapted to be connected to a selected viewing unit for filtering said selected two interference signals from said transmitted coded signal, a multiplicity of transformers, each having a tuned secondary and a primary winding, and means for connecting said primary windings in series between said input terminal and said output terminal, whereby said program signal is restored.

2. A television system as set forth in claim 1, wherein said means for connecting said primary windings in series comprises a plurality of inductors, each interconnecting two of said primary windings.

3. A television system as set forth in claim 1, wherein said multi-frequency trap is a three frequency trap, comprising three transformers; and
    wherein said transformers are located at right angles to one another, thereby minimizing magnetic coupling there between.

* * * * *